Dec. 14, 1954 C. C. CONLEY 2,696,914
FILTER
Filed Feb. 23, 1951

Inventor:
Charles C. Conley
by Hill, Sherman, Meroni, Gross & Simpson Attys

United States Patent Office 2,696,914
Patented Dec. 14, 1954

2,696,914
FILTER

Charles C. Conley, Detroit, Mich., assignor to Honan-Crane Corporation, Lebanon, Ind., a corporation of Indiana Application February 23, 1951, Serial No. 212,293

9 Claims. (Cl. 210—112)

The present invention relates to an improved filter construction for filtering foreign particles from a fluid. More particularly, the invention relates to a filter construction formed from a plurality of similar disks of suitable filtering material.

In a device for filtering dirt or foregin particles from a fluid, it is important that the filter efficiently remove the dirt from the fluid while still permitting a substantial fluid flow therethrough. Further, it is important that the filter be constructed in such a manner that the collected contaminant and any sludge accumulating will not substantially impede the flow of fluid through the filter during its useful life. In order for the filter to be commercially practical, it must be designed for expeditious fabrication and assembly without any sacrifice in the required operating characteristics.

The present filter utilizes some of the features of the surface filtration type and some of those of the depth filtration type filters.

In the surface type filters the foreign particles removed from the fluid are caught on the outer surface of the filter unit to form a slime bed or filter cake thereon. A very large surface area must be provided in this type of filter since the pressure drop through the filter cake increases very rapidly with increasing thickness thereof to prevent sufficient fluid flow through the filter after a fairly thin filter cake has been formed over the entire outer surface of the filter unit.

In the depth filtration type of filter unit the foreign particles in the fluid are caught and retained in the multitudinous minute interstices within the interior of the porous filter body. Ordinarily, the maximum depth filtration capacity of a filter unit is not realized because of a contemporaneous formation of a surface filter cake and a clogging of the filter interstices near the outer surface to impede the inward flow of fluid.

The filter unit of the present invention is constructed to take full advantage of both surface filtration and depth filtration. The filter body presents a relatively large surface area to the entering fluid, so that the formation of a filter cake covering the entire outer surface will require a relatively long time and will occur only after a great deal of fluid has been filtered through the unit.

In addition, my unit is so constructed that the filter cake will first form at that portion of the filter surface closest to the central outlet and will gradually build up radially outwardly. At the same time, the foreign particles not trapped at the surface of the filter will gradually fill the interstices in the filter body in such a manner that the flow of fluid through the filter unit is not substantially impeded until the entire outer surface is covered with the filter cake and most of the internal interstices have entrapped foreign particles.

The filter of the present invention is particularly adapted for use in the oil systems of internal combustion engines such as used in motor vehicles. In such an application a fairly high rate of flow is required without too great a pressure drop, together with efficient foreign particle removal. However, the invention is not to be restricted to this particular application since it is generally applicable for performing filtration functions wherever dirt or foreign particles must be removed from a fluid without greatly restricting the rate of fluid flow.

A feature of the invention is the construction of the filter in the form of a plurality of stacked disks which may be used with or without cementing of adjacent disks.

Another feature of the invention is the provision of substantially similar filter disks having dished or recessed annular portions serving both to provide means for holding the disks in stacked position and to provide a large surface filtration area to prevent premature clogging of the pores of the filter and to insure a substantial rate of flow therethrough.

An additional feature is the provision of dished disks or filtering members in a form particularly adaptable for accurate molding to preclude the necessity of any machining operations in the formation thereof.

It is, therefore, an object of the present invention to provide an improved filter construction.

Another object of the invention is to provide a filter unit comprising a plurality of stacked, dished disks or filter members so formed as to nest automatically and thus expedite the assembly of the filter unit.

A further object of the invention is to provide an improved filter constructed of a plurality of individually molded separable members, each of the members being so accurately dimensioned as not to require any machining operation.

Still another object of the invention is to provide a filter construction comprising nested filter members of substantially uniform configuration to insure positive sealing contact between adjacent members in the stack.

A still further object of the present invention is to provide a filter constructed with a plurality of nested disks or filter members of such configuration as to preclude the necessity of cementing adjacent disks.

Yet another object of the invention is to provide a filter construction having substantially improved filtration characteristics coupled with good flow characteristics.

Other objects, features and advantages of the present invention will be apparent from the following detailed description of one embodiment, by way of preferred example only, taken in conjunction with the accompanying drawings.

Figure 1:
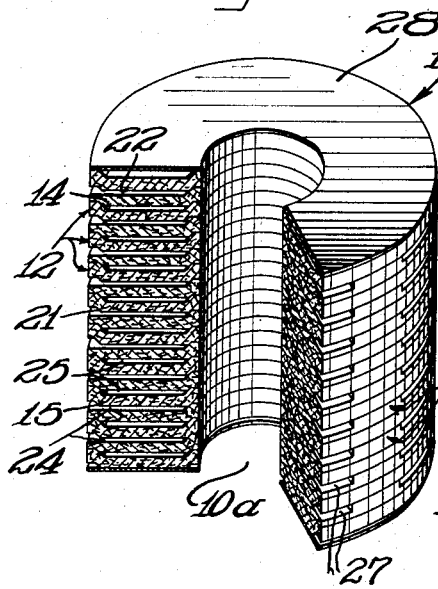
Figure 1 is a partially sectional perspective view of a filter according to the present invention.
Figure 2:
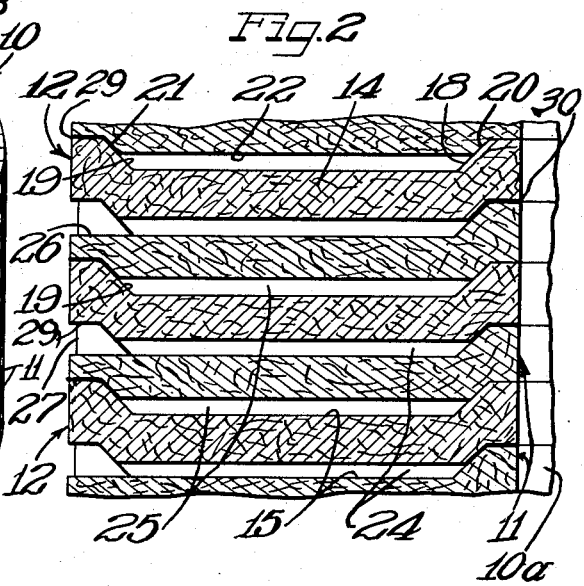
Figure 2 is an enlarged fragmentary vertical sectional view of a portion of the filter shown in Figure 1 showing the arrangement of filter chambers, with inlet passages to alternate chambers.
Figure 3:
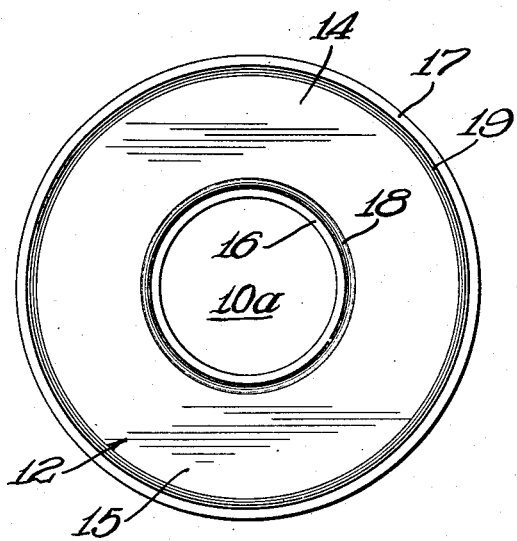
Figure 3 is a top plan view of one of the filter disks shown in Figure 1.
Figure 4:
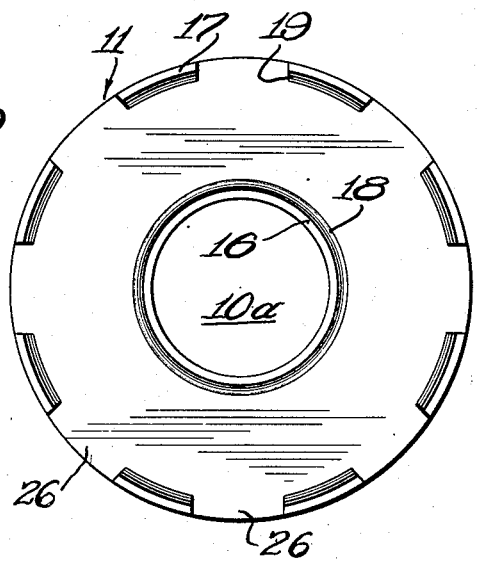
Figure 4 is a top plan view of another of the filter disks of Figure 1, slotted to provide an inlet.

In Figure 1 is shown a filter unit 10 in the form of a hollow cylinder having a central outlet chamber 10a therein and comprising a plurality of stacked, nested filter disks 11 and 12. Each of the filter disks or members 11 and 12 is of annular configuration with the same inside and outside diameters and is formed of porous filter material. The disks 11 and 12 are formed with annular downwardly offset body portions 14 which, when the disks are stacked, provide annular recesses 15 between successive disks, bounded by inner and outer annular rims or flanges 16 and 17. The inner and outer boundaries of the recesses 15 are defined by slanted or frusto-conical surface portions 18 and 19 of the flanges 16 and 17, respectively.

The lower surfaces of the annular offset portions 14 are bounded at the inner and outer edges thereof, respectively, by inwardly and outwardly slanted frusto-conical engagement surfaces 20 and 21 defining an annular raised bottom portion 22. The surfaces 20 and 21 conform with the surfaces 18 and 19, respectively, to provide nesting of the disks 11 and 12 when superimposed. The disks 11 and 12 are stacked alternately in nested relation with the bottom 22 of each body portion 14 projecting into the annular recess 15 of the disk next beneath. The bottoms 22 of the body portions 14 are shallower than the annular recesses 15 so that alternate annular filter chambers 24 and 25 are defined in the disks 11 and 12, respectively.

In order to permit the contaminated fluid to travel freely into the filter chambers 24, a plurality of spaced radial slots or grooves 26 are formed through the outer peripheral flanges 17 of the disks 11. The grooves 26 provide free entrance passages 27 into the inlet filter chambers 24.

As previously described, the filter 10 comprises a plurality of alternatively stacked or nested filter disks or filter members 11 and 12 with respective annular filter chambers 24 and 25 provided therebetween. The top disk of the stack is preferably an unslotted disk 12, and a top filter chamber 25 is formed between the disk and an annular flat closure plate 28.

In order to eliminate machining operations, the filter disks 11 and 12 are preferably molded to the final configurations shown in the drawings. Molding of the disks assures that they are fairly uniform in shape with reasonably accurately dimensioned flanges to insure good continuous contact between the abutted surfaces of adjacent disks.

In the formation of the disks it has been found that wood pulp fiber, such as alpha pulp, kraft or "Solka Floc BW-40" and others, impregnated with a binder such as a phenol-formaldehyde type of resin, is satisfactory from both a filtration and a molding standpoint. The density of the disks formed of the above materials is varied, depending upon filtering requirement, between approximately 0.30 and 0.40, using between approximately 5 and 40% resin binder. When properly cured, the disks have good dimensional stability.

The formation of the filter 10 with the nested disks 11 and 12 substantially decreases the time of assembly of the filter because of the self-centering features thereof. In addition, errors in centering are eliminated.

The filter can be utilized with or without cementing between the abutted surfaces of the adjacent filter disks, depending upon the purpose which the filter is to perform. In applications where a high efficiency of filtration is more important than a high flow of fluid through the filter, the adjacent disks 11 and 12 may be cemented together, as indicated at 29, between the outer peripheral abutting surfaces of adjacent disks and at 30 between the inner peripheral abutting surfaces. It will be noted that all of the outer abutting surfaces are cemented together while only the alternate inner abutting surfaces inward of the chambers 24 are cemented. The inner abutting surfaces inward of the chambers 25 are not cemented since the fluid reaching these chambers has already been filtered through the offset portions 14. Therefore, the flow rate is improved by omitting the cementing between these last surfaces, without any appreciable loss in filter efficiency.

However, in applications where a relatively high flow is required, such as in the lubricant systems of internal combustion engines, the respective disks of the filter can be held in place by means of tie rods, springs, or the like (not shown), to exert an axially inward load on the ends of the filter, without cementing the adjacent disks together. The filter efficiency of units formed without cementing is still high because of the good contact between the abutting surfaces of adjacent filter disks 11 and 12 and because of the devious leakage path between the filter chambers 24 and 25 and the outlet chamber 10a. Furthermore, the filter unit 10 formed of the nested filter disks will withstand a relatively high axial load because of the positive engagement between adjacent disks, so that the possible leakage between adjacent disks and the rate of flow through the filter can be easily controlled by varying the axial nesting load imposed by the tie rods.

In operation, unfiltered fluid such as lubricating oil enters the inlet filter chambers 24 through the inlet passages 27. From here the fluid can either filter radially directly into the outlet chamber 10a or axially in either direction through the offset portions 14 and into the filter chambers 25. When the disks are cemented at 30, as shown, direct filtering from chambers 24 into the outlet chamber 10a is for the most part prevented. From the chambers 25 the fluid filters directly radially into the outlet chamber 10a. The greater portion of the fluid will filter axially through the portions 14 of the disks rather than directly from the chamber 24 into the outlet chamber 10a because of the much greater surface area of the portion 14. Since the fluid in the chambers 24 is unfiltered, the build-up of sludge at the inward edge portions of the chambers will occur relatively rapidly to somewhat impede the flow therethrough and to induce flow into the filter chambers 25. Because the fluid which passes into the filter chamber 25 is substantially clean, the build-up of sludge or slime formed by the filtered-out foreign particles will be substantially less at the inward edge portions of the chamber 25. Hence, a double filtration process is undergone by most of the fluid passing through the filter 10. Furthermore, the arrangement results in a filling of most of the internal interstices of the unit with foreign particles contemporaneously with the covering of the entire outer surface with a filter cake. As a result, when the unit is exhausted, both the surface filtration and the depth filtration capacities have been substantially fully utilized.

From the above description it will be readily understood that the present invention provides an improved filter construction comprising a plurality of stacked, nested disks of suitable porous filtering material and provided with annular filter chambers therebetween. Fluid to be filtered enters directly into alternate filter chambers of the stacked disks where the major portion of the fluid is double-filtered through the material of the disks into the interior outlet chamber. The nested arrangement of the respective disks expedites the assembly of the filter and guards against excessive leakage between the adjacent disks. The filter disks may be readily molded to preclude the necessity for machining operations, and when molded are fairly uniform, to provide accurate abutting surfaces between adjacent disks to further guard against leakage therebetween. The filter unit may be formed with or without cementing between the adjacent disks. The filter construction described very efficiently performs the filtration process while still allowing for a fairly high rate of flow therethrough.

It will be understood that modifications and variations may be effected without departing from the scope of the novel concepts of the present invention.

I claim as my invention:

1. A filter comprising a plurality of stacked centrally apertured annular disks of porous material all having substantially similar configurations, said disks having integral annular inner and outer thickened flanges thereon defining annular recesses therebetween, said recesses defining annular closed filter chambers between the stacked disks, and a plurality of radial inlet slots formed through the outer annular flanges of alternate disks to provide openings into alternate filter chambers, and said chambers being closed off from direct communication with the center opening by the inner flanges.

2. A filter for removing foreign particles from a liquid passed therethrough comprising a plurality of nested centrally apertured disks of porous material all having substantially similar configurations, said disks having integral annular inner and outer axially thickened flanges thereon defining annular recesses therebetween, and annular engagement surfaces formed on the opposite side of each of said disks from said recesses, said recesses receiving said engagement surfaces to restrain relative radial movement between adjacent disks, the respective opposing faces of said recesses and the opposite sides of said disks and the opposed inner and outer annular flanges defining annular filter chambers between the nested disks.

3. A filter for removing contaminants from a liquid passed therethrough comprising a plurality of nested centrally apertured filter disks of porous material all having substantially similar configurations, said disks having annular recesses formed in one face thereof with inner and outer annular flanges defining said recesses, annular engagement surfaces formed on the faces of said disks opposite to said recesses, said engagement surfaces being received in said recesses to restrain relative radial movement between adjacent disks, the faces of said annular recesses and the opposite faces of each next adjacent disk and said inner and outer annular flanges defining annular filter chambers between nested disks, and radial inlets formed through the outer peripheral portions of alternate disks to provide openings to alternate filter chambers.

4. In a filter for removing foreign particles from a liquid passed therethrough, a plurality of nested centrally apertured annular disks of porous material, each of said disks having integral annular inner and outer rim portions and an intermediate annular portion axially offset from said rim portions, said rim and offset portions of each disk defining an annular recess on one face of said disk and an annular raised portion on the opposite side of said disk, said recess being of greater depth than the height of said raised portion, the defining edge portions of said recess and said raised portion being adapted for conforming contact with the respective defining edge portions of the annular raised portions and the annular recesses of the adjacent disks.

5. A filter for removing foreign particles from a liquid passed therethrough comprising a plurality of nested centrally apertured annular molded disks of porous filter material all having substantially similar configurations, said disks having annular recesses formed in one face thereof with annular inner and outer frusto-conical defining faces, respective annular raised portions formed on the faces of said disks opposite to said recesses, said engagement portions having respective frusto-conical inner and outer side surfaces, said raised portion side surfaces being in conforming contact with the opposing recess side faces of the next adjacent disks, said raised portions having a height less than the depth of said recesses to form closed annular filter chambers therebetween, every other one of said disks having radial inlets formed through the outer peripheral portions thereof to provide openings into every other one of said filter chambers, and means for holding said disks in nested relation.

6. In a filter for removing contaminants from a liquid passed therethrough, a centrally apertured filter disk of porous material comprising a flat annular portion and inner and outer integral annular rim portions axially offset from said flat portion and defining therebetween an annular recess on one side of said disk and an annular raised portion on the other side of the disk, said recess being of greater depth than the height of said raised portion.

7. In a filter for removing contaminants from a liquid passed therethrough, a centrally apertured filter disk of porous material comprising a flat annular portion and inner and outer integral annular rim portions axially offset from said flat portion defining an annular recess on one side of said disk and an annular raised portion on the other side of the disk, said recess being of greater depth than the height of said raised portion, said outer rim portion having a plurality of grooves therethrough on the recessed side of the disk to provide radial fluid inlet passages.

8. A filter for removing contaminants from a liquid passed therethrough comprising a plurality of stacked annular disks of porous material each having a central opening therein, said disks having annular closed filter chambers formed therebetween, every other one of said disks having radial inlets formed through the outer peripheral portions thereof to provide openings to every other one of said filter chambers, each of said disks being adhesively secured to each of the adjacent disks radially outwardly of said filter chambers, and only those disks in abutment radially inwardly of the chambers having an inlet thereto being adhesively secured together adjacent the central openings whereby liquid must pass axially through one of the disks.

9. A filter for removing contaminants from a liquid passed therethrough comprising a plurality of nested centrally apertured filter disks of porous material all having substantially similar configurations, said disks having annular recesses formed in one face thereof with inner and outer annular flanges defining said recesses, annular engagement surfaces formed on the faces of said disks opposite to said recesses, said engagement surfaces being received in said recesses to restrain relative radial movement between adjacent disks, the faces of said annular recesses and the opposite faces of each next adjacent disk and said inner and outer annular flanges defining annular filter chambers between nested disks, and radial inlets formed through the outer peripheral portions of alternate disks to provide openings to alternate filter chambers, each of said disks being adhesively secured to each of the adjacent disks radially outwardly of said filter chambers, said disks being adhesively secured to adjacent disks radially inwardly of said filter chambers having the inlets formed thereinto only.

References Cited in the file of this patent

UNITED STATES PATENTS

| Number | Name | Date |
| --- | --- | --- |
| 779,607 | Kiefer | Jan. 10, 1905 |
| 1,410,017 | Kessler | Mar. 21, 1922 |
| 2,134,061 | Thomas | Oct. 25, 1938 |
| 2,148,708 | Orr | Feb. 28, 1939 |
| 2,250,871 | Lumbert | July 29, 1941 |
| 2,455,486 | Hicks | Dec. 7, 1948 |
| 2,571,059 | Puschelberg et al. | Oct. 9, 1951 |
| 2,601,521 | Heftler | June 24, 1952 |
| 2,651,417 | Malanowski | Sept. 8, 1953 |

FOREIGN PATENTS

| Number | Country | Date |
| --- | --- | --- |
| 427 | Great Britain | Nov. 9, 1901 |
| 751,730 | France | June 26, 1933 |
| 317,879 | Italy | May 26, 1934 |
| 371,354 | Italy | May 20, 1939 |
| 693,349 | Germany | July 6, 1940 |